United States Patent [19]

Trautmann

[11] 3,898,556

[45] Aug. 5, 1975

[54] MAGNETOGRAPHIC TEST HEAD WITH AN ENDLESS MAGNETIC STORAGE TAPE WITH MEANS TO TENSION THE TAPE ON BOTH SIDES OF THE PRESSURE ROLLER

[75] Inventor: Wolfgang Trautmann, Reutlingen-Detzingen, Germany

[73] Assignee: Institut Dr. Forster, Reutlingen, Germany

[22] Filed: Feb. 25, 1974

[21] Appl. No.: 445,596

[30] Foreign Application Priority Data

Feb. 28, 1973 Germany ............................ 2309968

[52] U.S. Cl. ................................................... 324/37
[51] Int. Cl. ........................................... G01r 33/12
[58] Field of Search ........................................ 324/37

[56] References Cited

UNITED STATES PATENTS

| | | | |
|---|---|---|---|
| 3,491,288 | 1/1970 | Forster | 324/37 |
| 3,534,258 | 10/1970 | Forster | 324/37 |
| 3,656,054 | 4/1972 | Forster | 324/37 |
| 3,760,263 | 9/1973 | O'Connor et al. | 324/37 |

FOREIGN PATENTS OR APPLICATIONS

| | | | |
|---|---|---|---|
| 1,473,708 | 3/1969 | Germany | 324/37 |

*Primary Examiner*—Robert J. Corcoran

[57] ABSTRACT

A magnetographic test head has a pressure roller independently movable in a direction substantially perpendicular to the surface of the part being inspected. A tensioning device acts on the storage tape both ahead and aft the roller, tensioning the storage tape on both sides of the pressure roller by substantially the same amount.

The motion of the pressure roller may follow a straight or slightly curved path, depending upon whether the roller is supported in a slide, for example, or in a rocker. The tensioning device is optionally operated by a spring or a weight. In another aspect, the tensioning device has two tensioning elements, ahead and aft the pressure roller, and an auxiliary device mechanically coupling the two elements together. Where wide tape deflections must be compensated, the required tensioning forces may be high. In a further aspect, the tensioning device is controlled by the motion of the pressure roller so that, with properly proportioned control, no change occurs in the force with which the storage tape is tensioned when the pressure roller is moved.

7 Claims, 2 Drawing Figures

MAGNETOGRAPHIC TEST HEAD WITH AN ENDLESS MAGNETIC STORAGE TAPE WITH MEANS TO TENSION THE TAPE ON BOTH SIDES OF THE PRESSURE ROLLER

This invention relates to a magnetographic test head, and, more particularly, to such a test head having an endless recording tape with improved pressure applying and tensioning apparatus.

BACKGROUND OF THE INVENTION

It is known to provide a magnetographic head having an endless, rotating magnetic storage tape applied to, and unrolling on, the surface of a magnetized part to be inspected. The part is moved relative to said test head by a pressure roller and a device disposed aft of the roller in the direction of tape travel for scanning said magnetic storage tape for records of magnetic leakage fluxes emanating from the surface of the part at those points where defects are located.

Such test heads have been known for some time and are being increasingly used for inspecting elongate, semi-finished steel products for defects. Applications include inspection of welds of welded tubes (cf. U.S. Pat. No. 3,491,288) and inspection of billets, slabs and the like (cf. U.S. Pat. No. 3,534,258). Apart from the pressure roller and the scanning device, magnetographic test heads normally also include an erasing device by which the records of magnetic leakage fluxes caused by defects are erased after the storage tape has been scanned, thereby preparing the tape for recording further leakage fluxes caused by defects during its next passage past the part to be inspected. In many cases, a marking device is disposed on the test head to mark the locations of detected defects on the part being inspected. Frequently, the test head also includes a tape drive whose speed is controlled by the relative motion between the test head and part being inspected and which is rated so that the speed imparted to the storage tape by the tape drive corresponds to that which would be obtained if the storage tape merely unrolled on the surface of the part to be inspected, and in that way avoiding any slippage between the storage tape and the surface of the part and substantially reducing wear of the storage tape. The tape drive has the further advantage that the storage tape is already moving at its full speed when brought in contact with the surface of the part to be inspected by the application of the test head and that the storage tape maintains its speed after retraction of the test head from the surface of the part being inspected so that stored defect information recorded prior to such retraction is picked up and processed.

It follows that such a magnetographic test head must have a substantial mass that increases in proportion to the lateral dimensions of the part being tested, i.e., in proportion to the width of the storage tape required to cover the width of the part, e.g., a billet. On the other hand, the inspection of larger parts also involves larger tolerances, such as the curvature of billets. For safety reasons, the test head must be retracted from the surface of the billet prior to the passage of the leading or trailing end of the billet. This means that certain zones at the leading and trailing billet ends are not inspected and, consequently, are lost for production. Accordingly, the inspection of larger parts calls for heavier test heads which, owing to their greater mass, cannot be retracted as quickly as lighter heads and, in addition, must be retracted farther so that the length of the untested ends of the parts, and thus the losses, increase. This is all the more undesirable as the untested ends of larger parts are of themselves more costly than those of smaller parts.

Another drawback which the inspection of parts, and in particular large parts, with magnetographic test heads involves is that the quite substantial curvatures to be accommodated on the parts produce substantial vertical motions of the test head during passage of the part which, in view of the heavy weight of the test head, limits the maximum permissible test speed. In the last analysis, however, this is yet another factor contributing toward increased costs of production.

There is, therefore, a strong demand for a magnetographic head for the inspection of relatively large parts which avoids the above mentioned adverse effects of the weight of the test head resulting in losses due to untested ends and all while operating at the maximum possible test speed. It is an object of this invention to satisfy this demand. One condition which must be fulfilled in this connection results from the requirement that the test result should not only indicate the existence of defects which exceed an acceptable tolerance, but also their location. As already mentioned above, this correlation between test result and location of defect can be provided by a marking device, e.g., a paint spray gun, which is disposed on the test head opposite the part being tested and which, responsive to an electric defect pulse picked up from the storage tape by the scanning device, applies a color marking to the surface of the material to be tested. An expedient arrangement for obtaining the desired proper correlation of color marking and location of defect is one in which the distance from the point of contact between the surface of the part being inspected and the storage tape at which the marking device is disposed above the part equals the length of storage tape between the points of contact of the storage tape with the surface of the part on the one hand and of the storage tape with the scanning device on the other. This ensures that the distance which a defect travels up to the location of the marking device is the same as that which a defect signal recorded in the storage tape, which moves at the same speed, travels up to the location of the scanning device. As the correlation between location of defect and color marking must be maintained under all circumstances, a condition which any design of magnetographic test heads must fulfill is that the length of storage tape between the points of contact of the storage tape and scanning device on the one hand and the storage tape and part surface on the other remains the same even if the contact between storage tape and part surface is interrupted. This condition must also be fulfilled if the location of the defect is recorded true to scale on a strip of chart paper or recorded in any other manner instead of being marked directly on the part.

SUMMARY OF THE INVENTION

In accordance with the present invention, there is provided a magnetographic test head having a pressure roller movable independently of the rest of the magnetographic test head in a direction substantially perpendicular to the surface of the part being inspected. A tensioning device acts on the storage tape both ahead and aft of the pressure roller, which upon a movement of the pressure roller tensions the storage tape ahead and aft of the pressure roller by substantially the same amount.

The motion of the pressure roller may follow a straight or slightly curved path, depending upon whether the roller is supported in a slide, for example, or in a rocker. The tensioning device is optionally operated by the force of a spring or the gravity of a weight. According to a further aspect, the tensioning device includes two tensioning elements acting on the storage tape ahead and aft of the pressure roller and an auxiliary device for mechanically coupling the two tensioning elements together. In many instances, e.g., where wide tape deflections must be compensated, the tensioning forces required may be comparatively high. If a splice of the storage tape is not perfectly perpendicular to the direction of tape travel — a deficiency which cannot always be avoided — accurate true running of the storage tape may be jeopardized by the tensioning forces causing the tape to run out laterally. Changing tensioning forces may also elongate the tape and, thus, produce inaccurate defect location markings. According to a further advantageous development of the invention, the tensioning device is, therefore, controlled by the motion of the pressure roller so that, with properly proportional control, no change occurs in the force with which the storage tape is tensioned when the pressure roller is moved.

DESCRIPTION OF A PREFERRED EMBODIMENT

Figure 1:
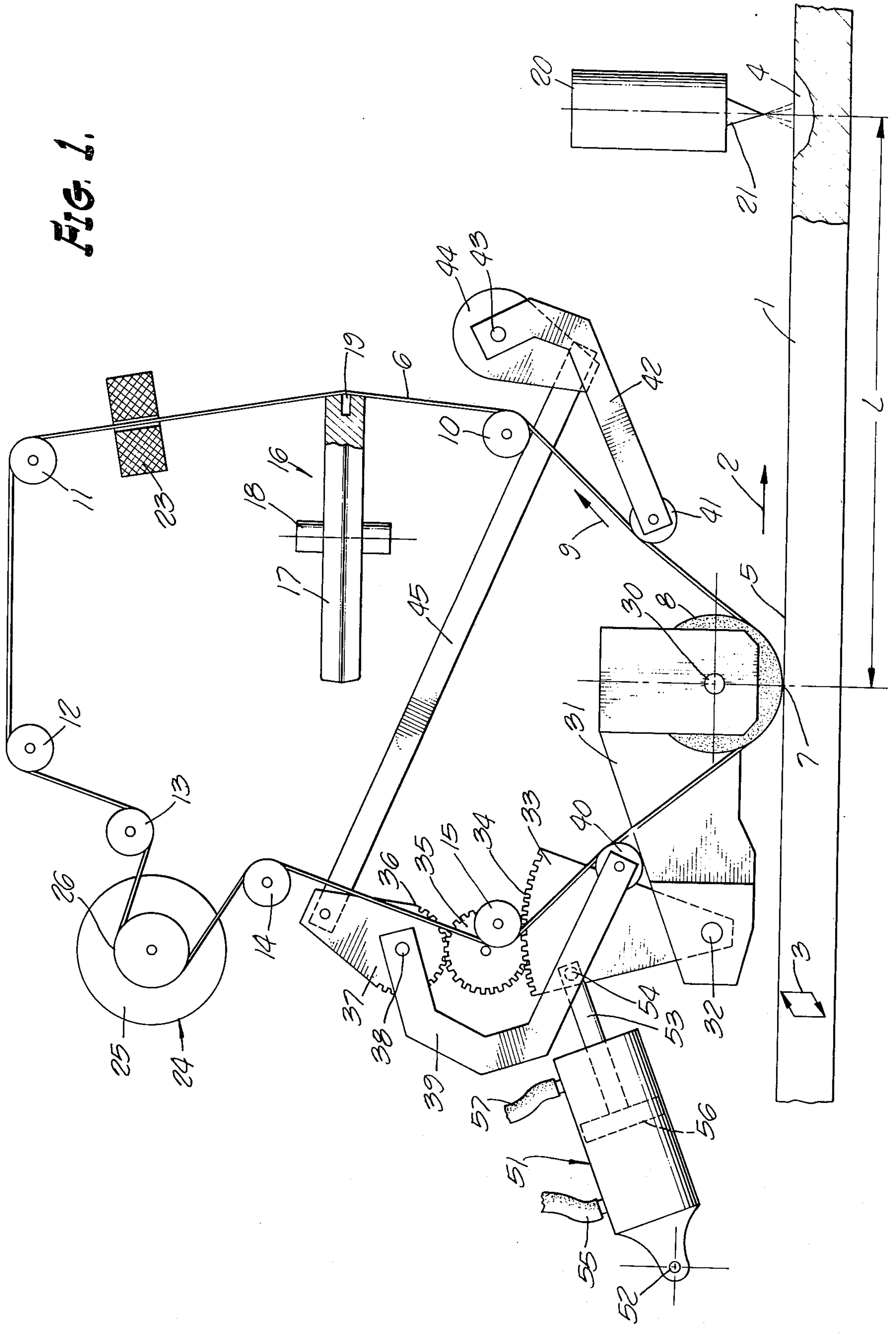
FIG. 1 is a schematic side view of a magnetographic test head in accordance with the invention.

FIG. 1 shows a schematic side view of a magnetographic test head in accordance with the present invention in which the mounting assembly, e.g., a mounting plate, carrying the individual elements of the test head, has been omitted for the sake of simplicity and greater clarity. The individual elements of the test head must, therefore, be imagined to be fastened or supported on a mounting plate in a suitable manner with the mounting plate itself being retained in a fixed or vertically adjustable position with respect to the path of the part being inspected, i.e., a billet 1, moving in the direction indicated by the arrow 2.

In the billet 1, a strong magnetic flux is produced by a magnetizing device which has also been omitted in the drawing. This flux may be produced by sending an electric current longitudinally through the billet so that a field pattern 3 is obtained which covers the square cross-section of the billet. At those points where the field pattern 3 is cut by a defect 4, a magnetic leakage flux emanates from the surface 5 of the billet 1 which is recorded by the magnetic storage tape 6 at the point of contact 7 between storage tape and billet surface. A pressure roller 8 made of a resilient material maintains the magnetic storage tape 6, which is moved in the direction indicated by the arrow 9, in constant contact with the surface 5 of the billet 1.

Along its path of travel, the storage tape 6 is supported by a number of guide rollers 10 through 15. The scanning device 16, which scans the storage tape 6 for records of defects recorded at the point of contact 7 with the surface of the part being inspected transversely to its direction of travel, is located aft of the first guide roller 10. The scanning device 16 comprises a disc 17, which may be rotated about an axle 18 by means of a drive (not shown), and of at least one magnetic-field responsive probe 19 disposed on the periphery of the disc, which, in its simplest form, may be a conventional sound head as employed for magnetic sound recording applications, and which converts the records of defects on the storage tape 6 to electric signals. Through sliding contacts or rotary transmitters (not shown), these electric signals are transmitted from the scanning device to an evaluation unit which provides a switching pulse when the recorded defect exceeds a tolerable limit.

The spray nozzle of a paint sprayer, which is also secured to the mounting plate, is so disposed above the path of the billet 1 that the surface 5 of the billet is hit by a paint jet when the paint sprayer is operated. The paint sprayer 20 and the evaluation unit are electrically connected to each other so that an electric pulse from the evaluation unit triggers the paint sprayer and a defect signal picked up by the scanning device 16 produces a color marking at the point where the defect 4 is located in the billet 1. To obtain color markings at the proper locations, the paint sprayer 20 is located along the path traveled by the billet at a distance L from the point of contact 7 between the storage tape 6 and the surface 5 of the billet which is equal to the length of the tape between the point of contact 7 and the scanning device 16.

An erasing device 23, which serves to erase the magnetic records on the storage tape and, thus, prepare the storage tape for new recordings during its next cycle, is provided for the storage tape 6 aft of the scanning device 16. Over the guide rollers 11, 12 and 13, the storage tape 6 is led to the tape drive 24 consisting of a drive motor 25 and a drive pulley 26 driven by the motor. As already described, the speed of the drive motor 25 is electrically controlled by the relative motion between the test head and the billet 1, so that the speed which the tape drive 25 imparts to the storage tape 6 is the same as that which would be obtained if the storage tape were simply unrolled on the billet surface 5, without an additional tape drive. The two guide rollers 13 and 14 provide a large angle of wrap of the storage tape 6 about the circumference of the drive pulley 26 and insure a slippage-free drive of the storage tape. After passing over a further guide roller 15, the storage tape 6 is returned to the pressure roller 8 and the point of contact 7 between the storage tape 6 and the surface 5 of the part being inspected.

The components of the magnetographic test head described up to this point correspond in design and layout to the components of a conventional magnetographic test head which could only be moved as a whole with respect to the surface of the part to be inspected. In the magnetographic test head of the present invention, however, the pressure roller which brings the storage tape in contact with the surface of the part being inspected is movable with respect to the remaining components of the test head. It follows the movements of the surface of the part caused by curvatures and irregularities. Also the pressure roller may be retracted from the surface of the part, for example, during entry or exit of the ends of the part being inspected, while the test head maintains its position unchanged. To achieve this, the axle 30 of the pressure roller 8 is mounted in a rocker 31 which, in turn, is rotatably supported on the mounting plate by the shaft 32. The center of rotation of the shaft 32 is disposed at a relatively low height above the surface 5 of the billet so that upon movement of the rocker 31 the lowermost point on the circumference of the pressure roller 8, which practically coincides with the point of contact 7 between the storage tape 6 and the surface 5 of the part 1, moves on a path which is approximately perpendicular to the surface of the part.

A toothed segment 33 is rigidly connected to the rocker 31 through the shaft 32. The toothed rim 34 of the toothed segment 33 transmits the movement of the latter to a gear 35 supported on the mounting plate and which, in turn, transmits this movement to the toothed rim 36 of an eccentric disc 37. The disc is supported on the mounting plate by means of, and rotatable about, a shaft 38. Through the same shaft 38, the eccentric disc 37 is rigidly coupled with a tensioning lever 39 at the front end of which a tensioning roller 40 is mounted, contacting the storage tape 6 ahead of the pressure roller 8. A second tension roller 41 is mounted at the end of a second tensioning lever 42 and contacts the storage tape 6 aft of the pressure roller 8. The tensioning lever 42 is rigidly connected to an eccentric disc 44 through a shaft 43 which is rotatably mounted to the mounting plate. The two eccentric discs 37 and 44 are so coupled to each other through a connecting rod 45 that the rotation of the first eccentric disc is so transmitted to the second disc that the latter rotates in the opposite direction. Assuming identical leverage of the two tensioning levers 39 and 42 as well as of the two eccentric discs 37 and 44, the auxiliary devices described above will translate any motion of the pressure roller 8 into a simultaneous equal amount of motion of the two tension rollers 40 and 41. By properly proportioning the transmission ratio of the motions, the tape length of the storage tape 6 between the point of contact 7 and the scanning device 16 is maintained constant independently of the motion of the pressure roller 8.

For positive control of the motion of the pressure roller 8, a pneumatic power cylinder 51 is provided which is rotatably suspended on the mounting plate by means of an axle 52. A piston rod 53 of the power cylinder 51 is operatively connected to the toothed segment 33 by a pin 54. In the condition shown in FIG. 1, the compressed air line 55 of the power cylinder is pressurized, while the second compressed air line 57 is vented. This causes the piston 56 to move outward and press the pressure roller 8 with the storage tape 6 against the surface 5 of the billet via the piston rod 53, toothed segment 33, shaft 32 and rocker 31. Similarly, upward movements of the pressure roller 8 owing to curvatures or irregularities of the billet 1 are transmitted back to the piston 56 and produce an increase in pressure in the rear chamber of the power cylinder 51. This increase in pressure is relieved by means of a pressure relief valve (not shown) connected to the compressed air line 55. The result is a uniform, resilient application of the storage tape 6 to the surface 5 of the billet by means of the roller 6.

Figure 2:
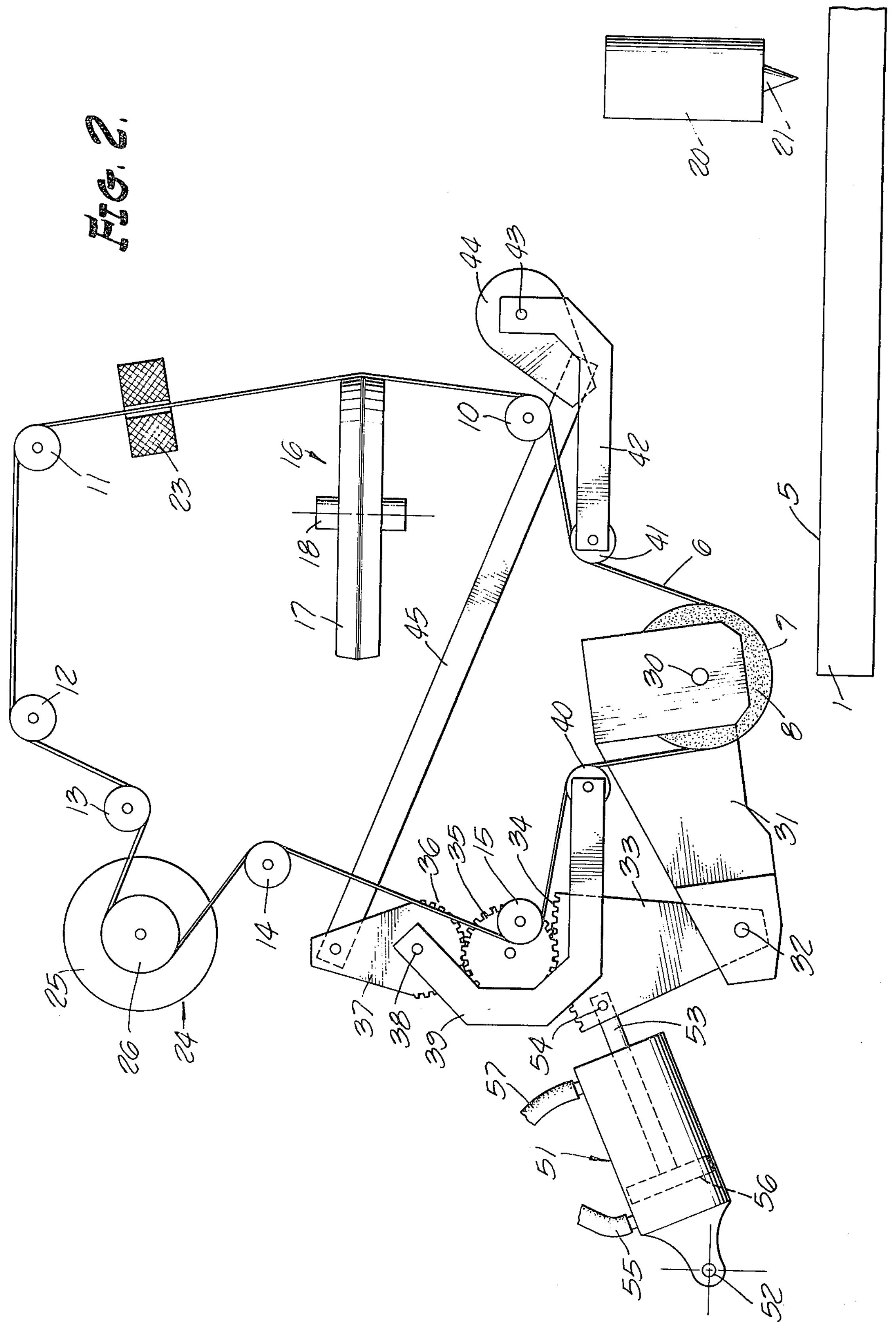
FIG. 2 shows the same magnetographic test head with the pressure roller in retracted position.

FIG. 2 shows the magnetographic test head of this invention with the pressure roller 8 retracted from the surface 5 of the billet. This is achieved by venting the compressed air line 55 of the power cylinder 51 and pressurizing the line 57. The piston 56 moves to its rearward position and, via piston rod 53, toothed segment 33 and rocker 31, lifts the pressure roller 8 from the surface 5 of the billet. As already described, this motion is accompanied by a follow-up motion of the tension rollers 40 and 41 which move the storage tape 6 inward by a corresponding amount, such that even during this relatively wide movement of the pressure roller 8, the length of the storage tape between the point of contact 7 and the scanning device 16 remains unchanged.

Retraction of the pressure roller 8 in the manner just described may be initiated by a control signal released by the operator. This will always be the case during setup of the test head, for example. However, automatic retraction and application of the pressure roller 6 as a function of billet conveyance is, of course, also possible. In this case, the control signal initiating the motion is provided by sensors located along the line of conveyance of the billet. These sensors cause the pressure roller 6 to be applied after the leading end of the billet has reached the test head and to be lifted before the trailing end of the billet reaches the test head. Damage to the storage tape and the pressure roller by sharp burrs, which may occur at the billet ends, is thus positively prevented.

What is claimed is:

1. Magnetographic test head apparatus for recording the presence of a defect in a moving part in which the defects are identified by a magnetic field extending outwardly of the part at the defect location, comprising:
a continuous magnetic tape belt;
a pressure roller urging the tape belt into contact with the outer surface of the moving part, said roller being movable toward and away from said tape belt; and
first and second means interconnected with the pressure roller and responsive to movement of said roller toward said tape belt for applying tension to the tape on both sides of said roller, respectively.

2. Magnetographic test head apparatus as in claim 1, in which there is further provided motor drive means interconnected with said tape belt for driving said belt at the same speed as the speed of movement of said part.

3. Magnetographic test head apparatus as in claim 1, in which said tension applying means includes first and second tensioning elements arranged in contact with said tape belt, one at each side of the pressure roller, and linkage interconnecting the tensioning elements with the pressure roller such that movement of the roller produces a corresponding movement of the tensioning elements.

4. Magnetographic test head apparatus as in claim 1, in whch there is further provided means for selectively moving the pressure roller toward and away from the part.

5. Magnetographic test head apparatus as in claim 1, in which there is further provided means for maintaining the pressure roller in contacting relation with the part except at the part ends.

6. In magnetographic test apparatus for recording magnetic flux emanations from defects in a part moving therepast, including a continuous belt of magnetic recording tape mounted adjacent the path of part movement, a resilient pressure roller bearing against the tape for urging it into contact with the part, a scanning device, and a drive motor for driving the tape in the same direction as the part movement, the improvement comprising:

a rocker mounting said pressure roller for providing individual pivotal movement of said pressure roller toward and away from the part;

first and second tensioning rollers located one at each side of the pressure roller and maintained in continuous contact with the tape; and linkage interconnecting the tensioning rollers with the rocker such that the tensioning rollers are equally moved to modify the tape tension in response to movement of the pressure roller toward and away from the part.

7. In magnetographic apparatus as in claim 6, in which there is further provided a cylinder and piston drive means interconnected with said rocker for positively and selectively moving the pressure roller toward and away from the part.

* * * * *